July 1, 1969  E. L. DYRE ET AL  3,452,550
MAINTAINING EFFECTIVENESS OF ADDITIVES IN
ABSORPTION REFRIGERATION SYSTEMS
Filed Nov. 13, 1967
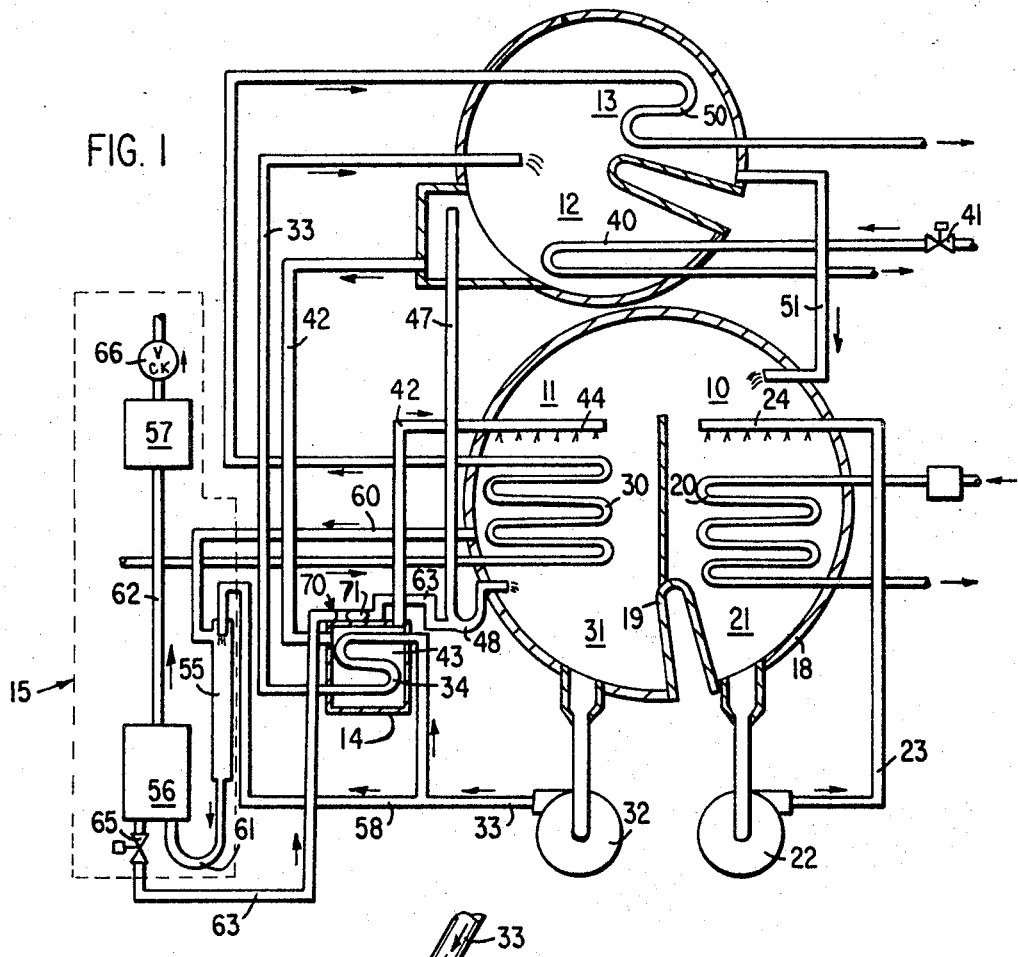
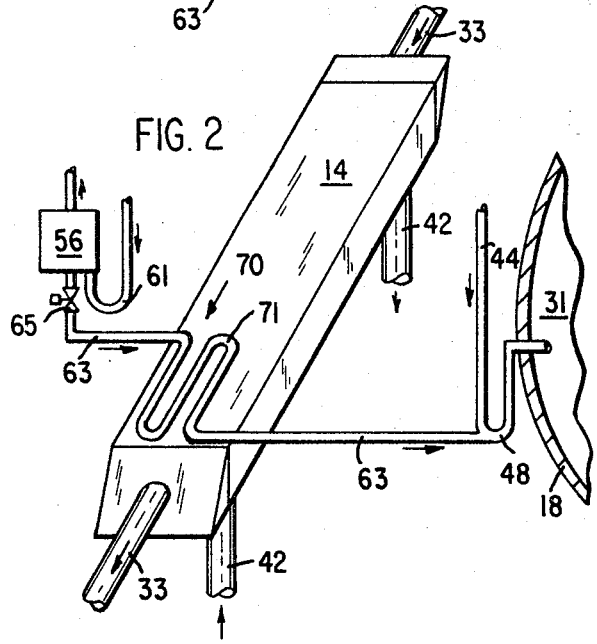
INVENTOR.
EDDIE L. DYRE
JOHN A. GREACEN.
BY
Frank N. Decker Jr.
ATTORNEY.

United States Patent Office 3,452,550
Patented July 1, 1969

3,452,550
MAINTAINING EFFECTIVENESS OF ADDITIVES IN ABSORPTION REFRIGERATION SYSTEMS
Eddie L. Dyre, Syracuse, and John A. Greacen, Fayetteville, N.Y., assignors to Carrier Corporation, Syracuse, N.Y., a corporation of Delaware
Filed Nov. 13, 1967, Ser. No. 682,442
Int. Cl. F25b 15/06
U.S. Cl. 62—85                              9 Claims

ABSTRACT OF THE DISCLOSURE

An absorption refrigeration system having an evaporator, an absorber, a generator, a condenser, a solution heat exchanger, and a purge unit with passages for passing absorbent solution from the absorber to the purge unit and for returning the purge effluent absorbent solution from the purge unit to the absorber. The system includes a heat transfer promoting additive in addition to the absorbent solution and refrigerant. The absorber includes an absorber-heat exchanger for cooling absorbent solution and promoting absorption of refrigerant vapor into the cooled absorbent solution in the absorber. The passage for returning the absorbent solution to the absorber contains a purge effluent heat exchanger section which is welded to the outside shell of the solution heat exchanger so that purge effluent solution is heated by hot strong absorbent solution to a temperature higher than the temperature of the solution in the absorber, thereby increasing the vapor pressure of the additive in the absorber to assist migration of the additive to the region of the absorber-heat exchanger.

BACKGROUND OF THE INVENTION

This invention relates to absorption refrigeration systems of the type which in addition to the usual components includes a purge unit through which absorbent solution passes and is returned to the absorber. It is well known that the addition of certain additives such as octyl alcohol (2-ethyl-n-hexanol) to an absorption refrigeration system produces a significant increase in the refrigeration capacity of the system. The exact manner in which this increase in capacity is effected is not completely understood. It is known, however, that when octyl alcohol is added to an absorption refrigeration system, the absorbent solution passing over the absorber-heat exchanger becomes turbulent and exhibits a ropy-film appearance while at the same time the heat transfer coefficient is materially increased over that which is observed with the normal laminar film when the additive is not present in the machine.

It has been observed that in a typical absorption refrigeration machine, the beneficial effect of adding octyl alcohol appears to gradually wear off over a period of time, necessitating periodic replenishment to maintain maximum refrigeration capacity from the system. It is believed that the additive, which has a higher vapor pressure than either the absorbent solution or the refrigerant, tends to accumulate in a stagnant pool on the surface of the solution in the absorber sump. Because the temperature of the solution in the sump is relatively low, with respect to that passing over the absorber tubes due to loss of heat through the shell, the temperature of the additive in the sump may be below that of the absorbent solution passing over the absorber-heat exchanger. Under these conditions, it is believed that insufficient additive escapes into the vapor phase from the absorber sump to effectively maintain the maximum refrigeration capacity of which the system is capable.

The heat transfer additive also appears to accumulate in liquid form at other relatively cool locations in the system and particularly in the purge unit. It has been observed, however, that when the cool additive is returned to the absorber sump from the purge unit, it is not fully effective in providing the increased refrigeration capacity expected, because of its low temperature.

It is an important feature of this invention to maintain the temperature of the additive in an absorber sump above that of the absorbent solution passing over the absorber-heat exchanger to promote vaporization of the additive and passage of the additive vapor to the region of the absorber-heat exchange, at which location it is effective to provide enhanced heat transfer and increased refrigeration capacity from the system.

SUMMARY OF THE INVENTION

In accordance with this invention, there is provided an absorption refrigeration system having a purge unit including a purge solution inlet passage to admit absorbent solution to the unit and a purge solution effluent passage for passing absorbent solution from the purge unit to the absorber sump. A purge effluent solution heat exchange is disposed in the purge solution effluent passage for passing the purge effluent solution from the purge unit to the absorber sump in heat exchange relation with hot strong absorbent solution passing from the generator to the absorber.

The returned solution is heated in the purge effluent solution heat exchanger to a temperature higher than the temperature of absorbent solution passing over the absorber-heat exchanger. Consequently, any additive being returned from the purge unit to the absorber enters the absorber with a higher vapor pressure than that of the additive in the absorber and passage of additive vapor toward the relatively cooler heat exchanger is promoted. In addition, the heating of the purge effluent solution passing into the absorber sump increases the temperature of additive on the surface of the absorber sump, by mixing with heated effluent, to a temperature greater than that of the absorbent solution passing over the absorber-heat exchanger, thereby vaporizing additive from the absorber sump and promoting its passage toward the cooler absorber-heat exchanger. Consequently, a substantial quantity of additive vapor is maintained in the region of the absorber-heat exchanger at all times during operation of the refrigeration system and the effectiveness of the additive is enhanced. In addition, the purge effluent solution cools the strong solution passing to the absorber, resulting in improving the efficiency of the system.

BRIEF DESCRIPTION OF THE DRAWINGS

FIGURE 1 illustrates a schematic cross-sectional flow diagram of an absorption refrigeration system employing a purge effluent solution heat exchange in accordance with this invention; and FIGURE 2 shows a schematic diagram illustrating in perspective a solution heat exchanger having a purge effluent solution heat exchange passage associated therewith.

DESCRIPTION OF THE PREFERRED EMBODIMENT

Referring to FIGURE 1 there is shown an absorption refrigeration system having an evaporator 10, an absorber 11, a generator 12, a condenser 13, a solution heat exchanger 14, and a purge unit 15 connected to provide refrigeration. An absorption system of the type described may employ an aqueous solution of lithium bromide as an absorbent solution and water as a refrigerant. As used herein the term "strong solution" refers to a concentrated absorbent solution which is strong in absorbing power, and the term "weak solution" refers to a dilute absorbent solution which is weak in absorbing power. The absorption refrigeration system has a heat transfer promoting additive therein such as octyl alcohol (2-ethyl-n-hexanol).

Evaporator 10 and absorber 11 are disposed within a common shell 18 having a partition 19 dividing the two sections. Evaporator 10 comprises an evaporator-heat exchanger 20 having inlet and outlet connections for a fluid medium which is cooled by heat exchange with evaporating refrigerant therein. Refrigerant liquid is discharged over evaporator-heat exchanger 20 collected in evaporator sump 21, from which it passes through refrigerant pump 22, and recirculation passage 23 to spray header 24 for re-distribution over the evaporator-heat exchanger.

Absorber 11 comprises absorber-heat exchanger 30 through which a cooling medium such as water from a cooling tower (not shown) passes in heat exchange relation with absorbent solution passing over the absorber-heat exchanger. Partition 19 forms with shell 18 an absorber sump 31 in which absorbent solution is collected and stored after passing over the absorber-heat exchanger. A weak solution pump 32 withdraws weak solution from absorber sump 31 and forwards it through weak solution passage 33 and the weak solution heat exchange passage 34 of a solution heat exchanger 14 to generator 12.

Generator 12 has disposed therein a generator-heat exchanger 40 through which a heating medium such as steam or hot water is passed to boil the absorbent solution in the generator, to concentrate the weak absorbent solution. The concentrated strong absorbent solution is returned from generator 12 to absorber 11 through strong solution passage 42 and the strong solution heat exchange passage 43 of solution heat exchanger 14.

Solution heat exchanger 14 is preferably a tube-in-shell heat exchanger comprising a plurality of interior heat exchange tubes 34 enclosed in an interior shell which forms exterior heat exchanger passage 43.

A generator overflow passage 47 extends from generator 12 to absorber sump 31. The inlet of generator overflow passage 47 extends a predetermined height above the bottom of generator 12 to establish a maximum solution level therein. Absorbent solution passes from generator 12 through overflow passage 47, around solution heat exchanger 14, directly into absorber sump 31 upon the occurrence of a predetermined level of solution in the generator. The lower portion of the generator overflow passage 47 is provided with a solution trap 48 to prevent vapor from passing into the absorber from generator 12. The operation of the generator overflow passage is more fully explained in U.S. Patent No. 3,206,947, granted Sept. 21, 1965.

Condenser 13 is provided with a condenser heat exchanger 50 through which a cooling medium such as water passes in heat exchange relation with a refrigerant vapor formed in generator 12. The refrigerant vapor which is boiled from the absorbent solution in the generator gives up its heat to the cooling medium and is condensed in condenser 13. The liquid refrigerant passes from condenser 13 through refrigerant liquid passage 51 and is discharged over evaporator-heat exchanger 20.

Purge unit 15 comrises a purge suction chamber 55, a separation chamber 56 and a gas storage chamber 57. A purge solution inlet passage 58 extends from weak solution passage 33 between the discharge of weak solution pump 32 and the weak solution inlet of solution heat exchanger 14. Weak solution from inlet passage 58 is discharged adjacent the upper portion of suction chamber 55. A purge line 60 extends from the region of absorber heat exchanger 30 in absorber 11 to suction chamber 55. Relatively noncondensible gases including additive vapors are induced from absorber 11 and entrained in absorbent solution ejected in suction chamber 55. A mixture of absorbent solution and gas is passed through vapor-liquid passage 61 to separation chamber 56 where they separate from each other. The purged gases rise through gas passage 62 and are accumulated in storage chamber 57. The separated absorbent solution passes from separation chamber 56 through a purge solution effluent passage 63, having a purge valve 65 therein, through solution trap 48 of generator overflow passage 47 to absorber sump 31. The purge effluent solution returning from the purge unit to the absorber sump via trap 48 flushes and maintains the concentration of solution in the trap sufficiently low to prevent solidification of strong absorbent solution therein.

During normal operation of the refrigeration system, a portion of the absorbent solution from weak solution passage 33 is continuously passed through purge solution inlet passage 48, suction chamber 55 and vapor-liquid passage 61 into separation chamber 56 together with entrained noncondensible gases. The absorbent solution is then returned to absorber 31 through purge solution effluent passage 63, trap 48 and generator overflow passage 47. When storage chamber 57 has been filled with noncondensible gas, purge valve 65 is closed, causing storage chamber 57 to be pressurized with solution from weak solution pump 32. When the pressure in storage chamber 57 reaches a predetermined pressure, an exhaust check valve 66 opens and vents the storage chamber to the atmosphere or other desired location to exhaust the noncondensible gases from the system after which purge valve 65 is opened, restoring the purge unit to normal operation. The purge unit described herein is similar to that more fully described in U.S. Patent No. 3,301,005, granted Jan. 31, 1967, but other purge units may be employed such as described in U.S. Patent 3,131,546, if desired.

In accordance with this invention, a purge effluent solution heat exchanger 70 is provided in purge solution effluent passage 63 for passing purge effluent absorbent solution in heat exchange relation with hot strong absorbent solution passing from generator 12 to absorber 11. Preferably purge solution effluent heat exchanger 70 comprises a purge solution effluent heat exchange passage 71 which may include one or more heat exchange tubes welded or otherwise secured to the hot end of solution heat exchanger 14 in heat exchange relation with the strong solution passage thereof.

As illustrated in FIGURE 2, the purge effluent solution heat exchanger passage preferably comprises a serpentine coil welded to the top surface of the exterior shell of solution heat exchanger 14. The serpentine coil is preferably transversely positioned adjacent the strong solution inlet passage so that solution returned to absorber 31 is heated by the warmest absorbent solution passing through heat exchanger 14. Consequently, it will be seen that the hot solution from generator 12 passes simultaneously in heat exchange relation with both chilled weak solution passing from absorber 11 to generator 12 and returning absorbent solution passing from purge unit 15 to absorber sump 31.

In operation, the purge effluent solution may comprise either absorbent solution or additive or a combination of both. The purge effluent solution passes through purge effluent passage 63 and purge effluent heat exchange section 70 where the effluent is heated by heat exchange with hot strong solution passing from generator 12 to absorber 11 through strong solution heat exchange passage 43 of solution heat exchanger 14. The heated purge effluent solution then passes into trap 48 of generator overflow passage 47. Purge effluent solution heat exchanger 70 is designed to provide sufficient heat exchange between the purge effluent solution and the strong solution to raise the temperature of the effluent solution above the temperature of both the additive and solution in sump 31 and the temperature of absorbent solution passing over at least the lower portion of absorber-heat exchanger 30.

In the illustrated embodiment, the purge effluent solution will comprise weak absorbent solution or additive which will dilute any strong solution remaining in trap 48 of generator overflow passage 47 and greatly inhibit solidification of the strong solution therein. Furthermore, the warm purge effluent solution heats solution remaining in trap 48 by mixing therewith and flushes the solution from the trap into absorber sump 31 so that solidification of solution in the trap is effectively prevented. It will be seen that cycle refrigeration efficiency is improved by the additional cooling effect of the purge effluent solution on the strong solution passing to the absorber.

The heated purge effluent solution entering absorber sump 31 mixes with absorbent solution and additive floating on the surface of the sump thereby increasing the vapor pressure of the additive above that which it would exhibit unless heat were supplied to the absorber sump. The additive in absorber sump 31 is preferably heated by mixing with the warm purge effluent solution to a temperature above that of the absorbent solution passing over the lower portion of absorber-heat exchanger 30. Consequently, the vapor pressure of additive in the sump is increased sufficiently to cause it to vaporize from the absorber sump and pass in a vapor state about the region of absorber-heat exchanger 30 where it is effective in increasing the heat transferred between absorbent solution and cooling medium which in turn results in increasing the refrigeration capacity of the system.

As previously described, substantial quantities of additive may accumulate in the purge unit. When additive is returned from the purge unit through purge effluent passage 63 to the absorber sump, it is heated above the temperature of additive and absorbent solution in the absorber sump so that it has a correspondingly higher vapor pressure. Thus, the additive tends to vaporize upon discharge into the absorber and pass directly into the region of absorber-heat exchanger 30 where it is effective to improve the capacity of the refrigeration system.

While a preferred embodiment of this invention has been described for purposes of illustration, it will be appreciated that the invention may be otherwise embodied within the scope of the following claims.

We claim:
1. An absorption refrigeration system comprising:
  (A) an evaporator for evaporating refrigerant to cool a fluid medium in heat exchange therewith;
  (B) an absorber, including an absorber heat exchanger, for absorbing refrigerant vapor formed in the evaporator into absorbent solution cooled in the absorber by heat exchange with a cooling medium;
  (C) a generator for separating refrigerant from weak absorbent solution and concentrating the absorbent solution by passing it in heat exchange relation with a heating medium to vaporize refrigerant therefrom;
  (D) a condenser for condensing refrigerant vapor formed in the generator by passing it in heat exchange relation with a cooling medium;
  (E) weak solution passage means for passing weak absorbent solution from the absorber to the generator for concentration thereof;
  (F) strong solution passage means for passing strong absorbent solution from said generator to said absorber for absorption of refrigerant vapor therein;
  (G) a purge unit for withdrawing gas from said absorber and transferring it to a desired location, said purge unit including a purge solution inlet passage for passing absorbent solution to said purge unit, and a purge solution effluent passage for passing absorbent solution from said purge unit to said absorber;
wherein the improvement comprises
  (H) a purge effluent solution heat exchanger disposed in said purge solution effluent passage for passing absorbent solution from said purge unit to said absorber in heat exchange relation with strong absorbent solution passing from said generator to said absorber, to heat the absorbent solution passing through said purge effluent passage to a temperature above the temperature of absorbent solution in said absorber.

2. An absorption refrigeration system as defined in claim 1 wherein said purge effluent solution passage is located so that it may also pass additive from said purge unit to said absorber and the additive passing through said purge effluent passage is heated by heat exchange with the strong solution to a temperature above the temperature of additive in said absorber, so that the heated additive entering said absorber migrates to the region of said absorber heat exchanger.

3. An absorption refrigeration system as defined in claim 1 wherein said absorber includes an absorber sump adapted to contain liquid additive and absorbent solution, and the heated absorbent solution passed through said purge effluent solution heat exchanger to the absorber is heated by heat exchange with strong solution to a temperature above the temperature of liquid in said absorber sump to promote vaporization of additive from the absorber sump and passage thereof to the region of said absorber heat exchanger.

4. An absorption refrigeration system as defined in claim 1 wherein said purge effluent solution heat exchanger comprises a portion of a solution heat exchanger for passing hot absorbent solution from the generator to the absorber in simultaneous heat exchange relation with both purge effluent absorbent solution passing from the purge unit to the absorber and weak absorbent solution passing from the absorber to the generator.

5. An absorption refrigeration system as defined in claim 1 including a solution heat exchanger having:
  (A) a weak solution heat exchange passage disposed in said weak solution passage means for passing weak absorbent solution from said absorber to said generator through said weak solution passage;
  (B) a purge effluent solution heat exchange passage forming a part of said purge effluent solution heat exchanger for passing absorbent solution from said purge unit to said absorber through said purge effluent solution heat exchange passage; and
  (C) a strong solution heat exchange passage disposed in said strong solution passage means for passing hot strong absorbent solution from said generator to said absorber through said strong solution passage in simultaneous heat exchange relation with both weak solution passing through said weak solution heat exchange passage and purge effluent solution passing through said purge effluent solution heat exchange passage.

6. An absorption refrigeration system as defined in claim 1 including:
  (A) a solution heat exchanger having a shell enclosing at least one solution heat exchange tube;
  (B) said weak solution passage means including means for passing weak absorbent solution from the absorber to the generator through the weak solution heat exchange tube in said solution heat exchanger;
  (C) said strong solution passage means including means for passing hot strong absorbent solution from said generator to said absorber through the shell of said solution heat exchanger and about the exterior of the solution heat exchange tube enclosed thereby; and
  (D) said purge effluent solution heat exchanger comprising at least one heat exchange tube secured to the exterior of the shell of said solution heat exchanger for heat exchange with hot strong absorbent solution passing through said shell.

7. An absorption refrigeration system as defined in claim 1 including:
  (A) a solution heat exchanger disposed in said strong solution passage and said weak solution passage for passing strong absorbent solution from said generator to said absorber in heat exchange relation with weak absorbent solution passing from said absorber to said generator;

(B) a generator overflow passage for passing absorbent solution from said generator to said absorber, out of contact with said solution heat exchanger, upon occurrence of a predetermined level of absorbent solution in said generator, and generator overflow passage including a solution trap therein; and (C) said purge effluent passage extending from said purge effluent solution heat exchanger to the generator overflow passage at a point therein such that absorbent solution heated in said purge effluent solution heat exchanger passes through said solution trap to warm, dilute and flush any strong absorbent solution therein.

8. A method of maintaining the effectiveness of an additive in an absorption refrigeration system having an absorbent solution, a refrigerant and an additive therein, which comprises the steps of:

(A) evaporating refrigerant in heat exchange relation with a fluid to be cooled to produce refrigeration;

(B) absorbing refrigerant vapor formed by evaporation thereof into an absorbent solution in an absorber, while passing the absorbent solution in heat exchange relation with a cooling medium therein;

(C) concentrating weak absorbent solution formed by absorption of refrigerant vapor therein by passing it in heat exchange relation with a heating medium to vaporize refrigerant therefrom and thereby forming hot strong absorbent solution;

(D) condensing refrigerant vapor formed by vaporizing refrigerant from weak solution to form liquid refrigerant;

(E) passing absorbent solution to a purge unit to withdraw relatively noncondensible gases from a region in said system where their presence is undesirable and transferring them to a desired location;

(F) passing effluent absorbent solution from the purge unit to the absorber; and (G) heating the effluent absorbent solution above the temperature of absorbent solution in the absorber by passing hot strong absorbent solution in heat exchange relation with the effluent absorbent solution passing from the purge unit to the absorber, thereby increasing the vapor pressure of additive in the absorber to promote vaporization of the additive and passage of the additive about the region of heat exchange between absorbent solution and cooling medium in the absorber.

9. A method of maintaining the effectiveness of an additive in an absorption refrigeration system as defined in claim 8 including the step of preheating weak absorbent solution prior to the step of concentrating thereof while simultaneously heating the effluent absorbent solution from the purge unit by passing hot strong absorbent solution in simultaneous heat exchange relation with both the weak absorbent solution passing from the absorber and the effluent absorbent solution passing from the purge unit.

References Cited

UNITED STATES PATENTS 3,138,005   6/1964   Bourne et al. _____ 62—475

LLOYD L. KING, Primary Examiner.

U.S. Cl. X.R.

62—475